(12) United States Patent
Jorgensen

(10) Patent No.: US 8,653,208 B2
(45) Date of Patent: Feb. 18, 2014

(54) PROCESS FOR PREPARING CATALYSTS AND CATALYSTS MADE THEREBY

(75) Inventor: Robert James Jorgensen, Scott Depot, WV (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 0 days.

(21) Appl. No.: 13/475,611

(22) Filed: May 18, 2012

(65) Prior Publication Data

US 2013/0310526 A1    Nov. 21, 2013

(51) Int. Cl.
*C08F 4/24* (2006.01)
*B01J 23/00* (2006.01)

(52) U.S. Cl.
USPC .......................................... 526/106; 502/319

(58) Field of Classification Search
None
See application file for complete search history.

(56) References Cited

U.S. PATENT DOCUMENTS

| | | | |
|---|---|---|---|
| 5,290,745 | A | 3/1994 | Jorgensen et al. |
| 6,187,866 | B1 | 2/2001 | Jorgensen et al. |
| 6,617,405 | B1 | 9/2003 | Jorgensen |
| 6,686,306 | B2 | 2/2004 | Shih |
| 6,825,287 | B2 | 11/2004 | Mawson et al. |
| 6,846,886 | B2 | 1/2005 | Mawson et al. |
| 2002/0107342 | A1 | 8/2002 | Mawson et al. |
| 2003/0022705 | A1 | 1/2003 | Kim et al. |
| 2003/0023010 | A1 | 1/2003 | Hottovy et al. |
| 2003/0027944 | A1 | 2/2003 | Hottovy et al. |
| 2003/0130111 | A1 | 7/2003 | Shih et al. |
| 2003/0224927 | A1 | 12/2003 | Shih |

FOREIGN PATENT DOCUMENTS

| | | | |
|---|---|---|---|
| EP | 1195388 | 4/2002 | |
| GB | 1253063 | * 11/1971 | ................ C08F 1/30 |
| WO | WO03016362 | 2/2003 | |
| WO | WO2004094489 | 11/2004 | |

OTHER PUBLICATIONS

Sage et al., "Cationic polymerization of styrene using mesoporous silica supported aluminum chloride," J. Mol. Catal. A.: Chem., 198 (2003) 349-358.*
U.S. Appl. No. 60/469,665, Michie, William Jr. et al.
U.S. Appl. No. 60/469,663, Upham, Stephanie.

* cited by examiner

*Primary Examiner* — Ling Choi
*Assistant Examiner* — Catherine S Branch

(57) ABSTRACT

A process for preparing a catalyst, and catalysts prepared thereby. The process includes selecting a catalyst support and mixing it with one or more chromium containing compounds oxidizable to a $Cr^{+6}$ state or already in a $Cr^{+6}$ state, and with one or more transition metal catalyst component, and calcining the catalyst support while oxidizing any chromium containing compound to a $Cr^{+6}$ state, and spray drying the catalyst support to form catalyst particles. The catalyst supports are characterized by a surface area greater than 50 $m^2$/gram and a pore volume greater than 0.5 cc/gram at the time of mixing the catalyst support with the chromium containing compound.

16 Claims, 1 Drawing Sheet

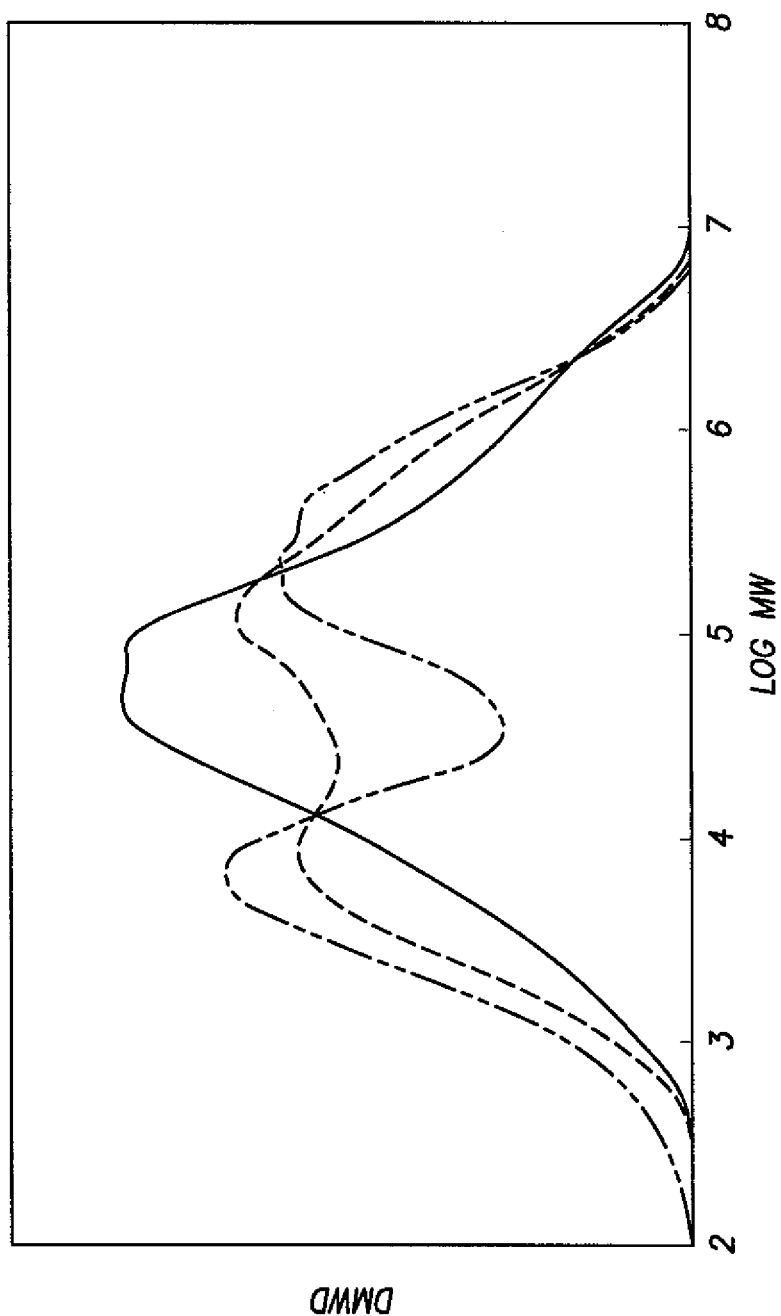

PROCESS FOR PREPARING CATALYSTS AND CATALYSTS MADE THEREBY

FIELD OF INVENTION

The instant invention relates to a process for preparing catalysts and catalysts made by such process.

BACKGROUND OF THE INVENTION

Existing processes for the production of multi-modal polyethylene typically rely on two or more polymerization reactors operating at different reaction conditions. Generally, in a two-reactor in series systems, catalyst is fed only to the first reactor in the series so that the polymer particles eventually produced are of more homogeneous composition, i.e. so that all particles contain polymer produced in both reactors. In continuous reactions systems, however, there always exists some level of polymer bypass (i.e. from one reactor into the next) such that all polymer particles do not have the same residence time in each of the two reactors. This may result in formation of polymer gels and non-homogeneous particles which may be difficult to melt process. Additionally, matching production rates in two (or more) reactors may be complicated due to catalyst decay and may also lead to polymer inhomogeneity. Further, in order to provide a broad molecular weight distribution, the individual polymer components produced in each reactor are frequently made to have different molecular weight peaks, leading to a "valley" in the molecular weight distribution of the final overall polymer product.

SUMMARY OF THE INVENTION

The instant invention is a process for producing a catalyst and catalyst made using such process.

In one embodiment, the instant invention provides a process for preparing a catalyst comprising (A) selecting a catalyst support from the group consisting of gels of silica, silica alumina, alumina, aluminum phosphate, aluminaphospate, and combinations of two or more thereof; (B) mixing the catalyst support with one or more chromium containing compound, wherein the chromium containing compound is selected from the group consisting of chromium containing compounds which are oxidizable to a $Cr^{+6}$ state and chromium containing compounds wherein the chromium is in a $Cr^{+6}$ state; (C) mixing the catalyst support with one or more transition metal catalyst component; (D) calcining the catalyst support; and (E) optionally for the chromium containing compound which is oxidizable to a $Cr^{+6}$ state, converting the chromium in the chromium containing compound to $Cr^{+6}$; and (F) spray drying the catalyst support to form catalyst particles; wherein steps (B)-(F) may occur separately in any order or wherein any one or more of steps (B)-(F) may be combined together; and wherein the catalyst support gels are characterized by a surface area greater than 50 $m^2$/gram and a pore volume greater than 0.5 cc/gram at the time of mixing the catalyst support gels with the chromium containing compound.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

FIG. 1 is a size exclusion chromatograph for polymers produced using Catalyst Example 7 and by a silyl chromate catalyst.

DETAILED DESCRIPTION OF THE INVENTION

The instant invention is a process for preparing a catalyst and catalysts made thereby.

The process for preparing a catalyst according to the present invention comprises: (A) selecting a catalyst support gel from the group consisting of gels of silica, silica alumina, alumina, aluminum phosphate, aluminaphospate, and combinations of two or more thereof; (B) mixing the catalyst support gel with one or more chromium containing compounds, wherein the chromium containing compound is selected from the group consisting of chromium containing compounds which are oxidizable to a $Cr^{+6}$ state and chromium containing compounds wherein the chromium is in a $Cr^{+6}$ state; (C) mixing the catalyst support gel with one or more transition metal catalyst components (D) calcining the catalyst support gel; and (E) optionally for the chromium containing compound which is oxidizable to a $Cr^{+6}$ state, converting the chromium in the chromium containing compound to $Cr^{+6}$; and (F) spray drying the catalyst support gel to form catalyst particles; wherein steps (B)-(F) may occur separately in any order or wherein any one or more of steps (B)-(F) may be combined together; and wherein the catalyst support gels are characterized by a surface area greater than 50 $m^2$/gram and a pore volume greater than 0.5 cc/gram at the time of mixing the catalyst support gels with the chromium containing compound.

In another embodiment, the instant invention provides a catalyst prepared in accordance with any of the embodiments of the process disclosed herein.

In a particular embodiment, the process to prepare a catalyst comprises (a) calcining a catalyst particle gel selected from the group consisting of gels of silica, silica alumina, alumina, aluminum phosphate, aluminaphosphate, and combinations of two or more thereof and characterized by a surface area greater than 50 $m^2$/gram and a pore volume greater than 0.5 cc/gram; (b) forming a suspension of the calcined catalyst support gel and an organochromate compound, such as bis(triphenylsilyl)chromate, in a suitable solvent; and (c) spray drying the suspension with a reducing agent for the chromate, wherein the reducing agent is selected from the group of methylalumoxane (MAO), modified methylalumoxane (MMAO), and $AlR_3$ where R is a hydrocarbon alkyl group having 8 or more carbon atoms.

In a particular embodiment, the process to prepare a catalyst comprises (a) mixing a chromium containing compound oxidizable to $Cr^{+6}$ with one or more catalyst support gels selected from the group consisting of silica, alumina, aluminum phosphate, silica alumina and aluminophosphate, wherein the catalyst support gel is characterized by a surface area greater than 50 $m^2$/gram and a pore volume greater than 0.5 cc/gram, to form a chromium impregnated catalyst support gel; (b) calcining the chromium impregnated catalyst support gel with an oxygen containing atmosphere to convert the chromium to $Cr^{+6}$ at a temperature between 350° C. to the sintering temperature of the catalyst support gel; (c) suspending the calcined chromium containing catalyst support gel in a solvent with one or more binders selected from the group of polymers which are soluble in said solvent and which are non-reactive to the $Cr^{+6}$ species, MAO, isobutylalumoxane and trialkylaluminum compounds wherein the alkyl group has 8 or more carbon atoms to form a suspension; and (d) spray drying the suspension.

In a particular embodiment, the process to prepare a catalyst comprises (a) calcining a catalyst particle gel selected from the group consisting of gels of silica, silica alumina, alumina, aluminum phosphate, aluminaphosphate, and combinations of two or more thereof; (b) comminuting the catalyst particle gel to achieve a gel characterized by a surface area greater than 50 m$^2$/gram and a pore volume greater than 0.5 cc/gram; (c) forming a suspension of the calcined catalyst support gel and an organochromate compound, such as bis(triphenylsilyl)chromate, in a suitable solvent; and (d) spray drying the suspension with a reducing agent for the chromate, wherein the reducing agent is selected from the group of methylalumoxane (MAO), modified methylalumoxane (MMAO), and AlR$_3$ where R is a hydrocarbon radical having 8 or more carbon atoms.

In yet another embodiment, the process to prepare a catalyst comprises (a) mixing a chromium containing compound oxidizable to Cr$^{+6}$ with one or more catalyst support gels selected from the group consisting of silica, alumina, aluminum phosphate, silica alumina and aluminophosphate, to form a chromium impregnated catalyst support gel; (b) calcining the chromium impregnated catalyst support gel with an oxygen containing atmosphere to convert the chromium to Cr$^{+6}$ at a temperature between 350° C. to the sintering temperature of the catalyst support gel; (c) comminuting the calcined catalyst support gel to achieve a gel characterized by a surface area greater than 50 m$^2$/gram and a pore volume greater than 0.5 cc/gram, (d) suspending the calcined chromium containing catalyst support gel in a solvent with one or more binders selected from the group of polymers which are soluble in said solvent and which are non-reactive to the Cr$^{+6}$ species, MAO, isobutylalumoxane and trialkylaluminum compounds wherein the alkyl group has 8 or more carbon atoms to form a suspension; and (e) spray drying the suspension.

In yet another embodiment, the process to prepare a catalyst comprises (a) mixing a chromium containing compound oxidizable to Cr$^{+6}$ with one or more catalyst support gels selected from the group consisting of silica, alumina, aluminum phosphate, silica alumina and aluminophosphate characterized by a surface area greater than 50 m$^2$/gram and a pore volume greater than 0.5 cc/gram to form a chromium containing catalyst support gel; (b) calcining the chromium containing catalyst support gel in an oxygen containing atmosphere to convert the chromium to Cr$^{+6}$ state; (c) suspending the calcined chromium containing catalyst support gel in a solvent containing one or more binders, wherein the one or more binders is selected from the group consisting of polymers soluble in said solvent which are non-reactive to the Cr$^{+6}$ species, MAO, isobutylalumoxane (IBAO), trialkylaluminum compounds wherein the alkyl has 8 or more carbon atoms, to form a suspension; (d) adding to the suspension at least one transition metal component which is activatable by MAO or IBAO; (e) adding MAO or IBAO to the suspension; and (f) spray drying the suspension.

In yet another embodiment, the process to prepare a catalyst comprises (a) calcining a catalyst particle gel selected from the group consisting of gels of silica, silica alumina, alumina, aluminum phosphate, aluminaphosphate, and combinations of two or more thereof and characterized by a surface area greater than 50 m$^2$/gram and a pore volume greater than 0.5 cc/gram; (b) suspending the calcined catalyst support gel in a solvent to form a suspension; (c) adding silyl chromate to the suspension; (d) adding one or more binders selected from the group consisting of polymers soluble in said solvent which are non-reactive to the Cr$^{+6}$ species, MAO, IBAO, trialkylaluminum compounds wherein the alkyl has 8 or more carbon atoms to the suspension; (e) adding to the suspension MAO and/or IBAO unless already added in step (d); (f) spray drying the suspension.

In yet another embodiment, the process to prepare a catalyst comprises (a) mixing a chromium containing compound oxidizable to Cr$^{+6}$ with one or more catalyst support gels selected from the group consisting of gels of silica, silica alumina, alumina, aluminum phosphate, aluminaphosphate, and combinations of two or more thereof and characterized by a surface area greater than 50 m$^2$/gram and a pore volume greater than 0.5 cc/gram to form a chromium containing catalyst support gel; (b) calcining the chromium containing catalyst support gel in an oxygen containing atmosphere to convert the chromium to a Cr$^{+6}$ state; (c) suspending the calcined product in a solvent containing one or more binders selected from the group consisting of polymers soluble in said solvent which are non-reactive to the Cr$^{+6}$ species, MAO, IBAO, trialkylaluminum compounds wherein the alkyl has 8 or more carbon atoms to form a suspension; (d) adding to the suspension at least one transition metal component which self supports on the catalyst support gel; (e) adding to the suspension MAO and/or IBAO to unless added in step (c); (f) spray drying the suspension.

In yet another embodiment, the process to prepare a catalyst comprises (a) mixing a chromium containing compound oxidizable to Cr$^{+6}$ with one or more catalyst support gels selected from the group consisting of gels of silica, silica alumina, alumina, aluminum phosphate, aluminaphosphate, and combinations of two or more thereof and characterized by a surface area greater than 50 m$^2$/gram and a pore volume greater than 0.5 cc/gram to form a chromium containing catalyst support gel; (b) calcining the chromium containing catalyst support gel in an oxygen containing atmosphere to convert the chromium to a Cr$^{+6}$ state; (c) suspending the calcined product in a solvent to form a suspension; (d) adding to the suspension a slurry formed by (i) calcining one or more catalyst support gels characterized by a surface area greater than 50 m$^2$/gram and a pore volume greater than 0.5 cc/gram; (ii) suspending the calcined product of step (d) (i) in a solvent; and (iii) adding silyl chromate to form a slurry; (e) adding to the suspension one or more binders selected from the group consisting of polymers soluble in said solvent which are non-reactive to the Cr$^{+6}$ species, MAO, IBAO and trialkylaluminum compounds where the alkyl has 8 or more carbon atoms; (f) adding to the suspension MAO, MMAO or IBAO if not added in step (e); (g) adding to the suspension a transition metal component that is activatable by MAO or IBAO; and (h) spray drying the suspension.

In yet another embodiment, the process to prepare a catalyst comprises (a) mixing a chromium containing compound oxidizable to Cr$^{+6}$ with one or more catalyst support gels selected from the group consisting of silica, alumina, aluminum phosphate, silica alumina and aluminophosphate, wherein the catalyst support gel is characterized by a surface area greater than 50 m$^2$/gram and a pore volume greater than 0.5 cc/gram, to form a chromium containing catalyst support gel; (b) calcining the chromium containing catalyst support gel in oxygen containing atmosphere to convert the chromium to a Cr$^{+6}$ state; (c) suspending the calcined product in a solvent to form a suspension; (d) adding to the suspension a slurry formed b: (i) mixing a chromium containing compound oxidizable to Cr$^{+6}$ with one or more catalyst support gels selected from the group consisting of silica, alumina, aluminum phosphate, silica alumina and aluminophosphate, wherein the catalyst support gel is characterized by a surface area greater than 50 m$^2$/gram and a pore volume greater than 0.5 cc/gram, to form a chromium containing catalyst support gel; (ii) calcining the chromium containing catalyst support gel in an oxygen containing atmosphere to convert the chromium to a $Cr^{+6}$ state; (iii) suspending the calcined product in a solvent containing one or more binders selected from the group consisting of polymers soluble in said solvent which are non-reactive to the $Cr^{+6}$ species, MAO, IBAO and trialkylaluminum compounds where the alkyl group has 8 or more carbon atoms; and (iv) adding to the suspension at least one transition metal component which is activated by MAO or IBAO; (e) adding to the suspension one or more binders selected from the group consisting of polymers soluble in said solvent which are non-reactive to the $Cr^{+6}$ species, MAO, IBAO and trialkylaluminum compounds where the alkyl group has 8 or more carbon atoms; and (f) spray drying the suspension.

In yet another embodiment, the process to prepare a catalyst comprises (a) calcining one or more catalyst support gels selected from the group consisting of silica, alumina, aluminum phosphate, silica alumina and aluminophosphate, wherein the catalyst support gel is characterized by a surface area greater than 50 m²/gram and a pore volume greater than 0.5 cc/gram; (b) suspending the calcined support gel in a solvent to form a suspension; (c) adding to and reaction with the suspension a cationic activator capable of activating metallocene and non-metallocene type catalysts (as defined in U.S. Pat. No. 6,825,287, incorporated herein by reference); (d) adding a solvent containing one or more binders selected from the group consisting of polymers soluble in said solvent which are non-reactive to the $Cr^{+6}$ species, MAO, IBAO and trialkylaluminum compounds where the alkyl group has 8 or more carbon atoms; (e) adding a metallocene and/or non-metallocene catalyst activatable by the cationic activator added in step (c); (f) adding MAO or IBAO to the suspension unless already added in step (d); (g) spray drying the suspension.

In an alternative embodiment, the instant invention provides a process for preparing a catalyst and a catalyst made thereby, in accordance with any of the preceding embodiments, except that the process further comprises dispersing the spray dried catalyst particles into a mineral oil slurry for catalyst feed in a polymerization reactor.

In an alternative embodiment, the instant invention provides a process for preparing a catalyst and a catalyst made thereby, in accordance with any of the preceding embodiments, except that the process further comprises using the spray dried catalyst particles as a dry powder for catalyst feed in a polymerization reactor.

In another alternative embodiment, the instant invention provides a process for preparing a catalyst and a catalyst made thereby wherein the process consists essentially of: (A) selecting a catalyst support gel from the group consisting of gels of silica, silica alumina, alumina, aluminum phosphate, aluminaphosphate, and combinations of two or more thereof; (B) mixing the catalyst support gel with one or more chromium containing compound, wherein the chromium containing compound is selected from the group consisting of chromium containing compounds which are oxidizable to a $Cr^{+6}$ state and chromium containing compounds wherein the chromium is in a $Cr^{+6}$ state; (C) mixing the catalyst support gel with one or more transition metal catalyst components (D) calcining the catalyst support gel; and (E) optionally for the chromium containing compound which is oxidizable to a $Cr^{+6}$ state, converting the chromium in the chromium containing compound to $Cr^{+6}$; and (F) spray drying the catalyst support gel to form catalyst particles; wherein steps (B)-(F) may occur separately in any order or wherein any one or more of steps (B)-(F) may be combined together; and wherein the catalyst support gels are characterized by a surface area greater than 50 m²/gram and a pore volume greater than 0.5 cc/gram at the time of mixing the catalyst support gels with the chromium containing compound.

Catalyst Support Gels

Embodiments of the process utilize catalyst support gels characterized by a surface area greater than 50 m²/gram at the time of mixing the catalyst support gels with the chromium containing compound. All values and subranges from greater than 50 m²/gram are included herein and disclosed herein. For example, the catalyst support gels may have a surface area greater than 50 m²/gram; or in the alternative, the catalyst support gels may have a surface area greater than 75 m²/gram; or in the alternative, the catalyst support gels may have a surface area greater than 100 m²/gram. In alternative embodiments, the catalyst support gels may have a surface area from greater than 50 m²/gram to 75 m²/gram, or in the alternative, from 60 m²/gram to 80 m²/gram, or in the alternative, from 100 m²/gram to 200 m²/gram, or in the alternative, from 150 m²/gram to 350 m²/gram, or in the alternative, from 200 m²/gram to 325 m²/gram, or in the alternative, from 250 m²/gram to 350 m²/gram.

Embodiments of the process utilize catalyst support gels characterized by a pore volume greater than 0.5 cc/gram at the time of mixing the catalyst support gels with the chromium containing compound. All individual values and subranges of greater than 0.5 cc/gram are included herein and disclosed herein. For example, the catalyst support gels may be characterized by a pore volume greater than 0.5 cc/gram; or in the alternative, the catalyst support gels may be characterized by a pore volume greater than 0.65 cc/gram; or in the alternative, the catalyst support gels may be characterized by a pore volume greater than 0.8 cc/gram. In alternative embodiments, the catalyst support gels may be characterized by a pore volume from greater than 0.5 cc/gram to 1.1 cc/gram; or in the alternative, from 0.6 cc/gram to 0.8 cc/gram.

In an alternative embodiment, the instant invention provides a process for preparing a catalyst and a catalyst made thereby, in accordance with any of the preceding embodiments, except that catalyst support gels are characterized by a thermal stability up to 600° C. with certain of the catalyst support gels exhibiting thermal stability to as high as 900° C. All individual values and subranges of up to 600° C. are included herein and disclosed herein. For example, the thermal stability of the catalyst support gels may be to an upper limit of 500, 525, 550, 575 or 600° C. As used herein, the term "thermal stability" means that the catalyst support gel exhibits less than 5% change in surface area or pore volume.

In an alternative embodiment, the instant invention provides a process for preparing a catalyst and a catalyst made thereby, in accordance with any of the preceding embodiments, except that catalyst support gels are characterized by a particle size, $D_{90}$, of less than 15 microns. All individual values and subranges of less than 15 microns are included herein and disclosed herein. For example, the particle size, $D_{90}$, may be from an upper limit of 15, 14, 13, 12, 11, 10, 9 or 8 microns.

In an alternative embodiment, the instant invention provides a process for preparing a catalyst and a catalyst made thereby, in accordance with any of the preceding embodiments, except that catalyst support gels are characterized by a particle size, $D_{10}$, of greater than 0.5 micron. All individual values and subranges of greater than 0.5 micron are included herein and disclosed herein. For example, the particle size, $D_{10}$, may be from a lower limit of 0.5, 0.6, 0.7, 0.8, 0.9, 1.0, Or 1.1 microns.

In an alternative embodiment, the instant invention provides a process for preparing a catalyst and a catalyst made thereby in accordance with any of the preceding embodiments, except that the catalyst support gel has a larger particle size which is comminuted, either before or after the thermal treatment and/or Cr compound deposition.

In an alternative embodiment, the instant invention provides a process for preparing a catalyst and a catalyst made thereby in accordance with any of the preceding embodiments, except that the catalyst support gel acts as both a support for the active catalyst metal, i.e., chromium, and an integral part of the catalyst composition.

Chromium Containing Compounds

Chromium containing compounds useful in embodiments of the invention are chromium containing compounds supported on a catalyst support gel (in accordance with embodiments of the invention) wherein the chromium-containing compound comprises a chromium which is oxidizable to a $Cr^{+6}$ valence state (or "state"). With such chromium oxide type compounds, the oxidation may occur in a calcination step. The oxidized chromium containing compound (i.e. in the $Cr^{+6}$ state) oxide may be subsequently reducible by chemical means to the active polymerization catalyst, either prior to introduction to the polymerization reactor or in the polymerization reactor In an alternative embodiment, the instant invention provides a process for preparing a catalyst and a catalyst made thereby in accordance with any of the preceding embodiments, except that a supported chromium oxide type catalyst is used and that the catalyst includes a titanate promoter. Such titanate promoter may be included in the catalyst support gel during catalyst support gel manufacture or added separately during a chromium deposition step (e.g., step (B) of mixing the chromium containing compound with the catalyst support gel) or during the thermal treatment. In yet an alternative embodiment, titanate promoter may be added during both a chromium deposition step and during thermal treatment.

In an alternative embodiment, the instant invention provides a process for preparing a catalyst and a catalyst made thereby in accordance with any of the preceding embodiments, except that the chromium containing compound is characterized by the formula $(R^aO)_2CrO_2$ where $R^a$ is a silyl group or an organic ester. Exemplary chromium containing compounds include the bis(triarylsilyl)chromates, such as bis(triphenylsilyl)chromate.

In an alternative embodiment, the instant invention provides a process for preparing a catalyst and a catalyst made thereby in accordance with any of the preceding embodiments, except the chromium containing compound is one or more $Cr^{+2}$ compounds which react with hydroxyl groups on the surface of the catalyst support gel. Such $Cr^{+2}$ compounds are exemplified by the formula $R^b_2Cr$ where $R^b$ is a substituted or unsubstituted indenyl or cyclopentadienyl and wherein the two $R^b$ groups may be the same or different groups. Exemplary $Cr^{+2}$ compounds include bis-cyclopentadienylchromium; bis-indenylchromium; and bis-pentamethycyclopentadienylchromium.

Transition Metal Catalyst Component

Transition metal catalyst components useful in embodiments of the invention include those activated by methylalumoxane (MAO) and isobutylalumoxane (IBAO) and disclosed in U.S. Patent Application Publication No. 20020107342, the disclosure of which is hereby incorporated by reference.

In an alternative embodiment, the instant invention provides a process for preparing a catalyst and a catalyst made thereby in accordance with any of the preceding embodiments, except the transition metal catalyst component is represented by the formula, formula 1:

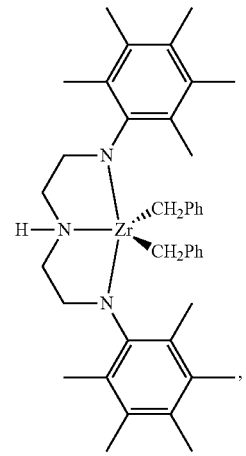

wherein Ph indicates phenyl.

In an alternative embodiment, the instant invention provides a process for preparing a catalyst and a catalyst made thereby in accordance with any of the preceding embodiments, except the transition metal catalyst component is represented by the following formula, formula 2:

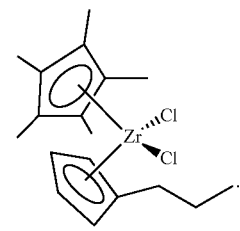

In an alternative embodiment, the instant invention provides a process for preparing a catalyst and a catalyst made thereby in accordance with any of the preceding embodiments, except the transition metal catalyst component comprises one or more active metals selected from the group consisting of Zr, Hf, and Ti.

Binders

In an alternative embodiment, the instant invention provides a process for preparing a catalyst and a catalyst made thereby in accordance with any of the preceding embodiments, except that one or more binders are added to the catalyst support gel, chromium containing compound and transition metal compound. Binders may be added as a means of improving the catalyst support gel morphology, i.e. narrowing the particle size distribution, lower porosity of the particles and allowing for a reduced quantity of alumoxane, which is acting as a 'binder.' The binder should be soluble in aromatic solvent and inert to the active catalyst components. In a particular embodiment, the one or more binders which are soluble in aromatic solvents and which are selected from the group consisting of methylalumoxane, polystyrene, polystyrene-ethylene copolymer, polysytrene allyl alcohol copolymers, polyvinylchloride, polyisoprene, polybutadiene, partially hydrogenated polyisoprene, modified methylalumoxane, polyvinylacetate, isobutylalumoxane, and trialkylaluminum compounds having the formula $AlR_3$ where each R is selected from the group consisting of saturated alkyls having less than twelve carbon atoms.

Other binder materials, soluble in the suspension solvent and that are inert to the catalytic components may be used.

Polymerization Reaction Systems Useful with the Catalysts

Catalysts prepared in accordance with the embodiments of the inventive process may be used in producing polyethylene in any known polymerization system. Exemplary polymerization systems include gas phase and slurry polymerization systems. Exemplary slurry reaction systems include those using loop reactors (as described in U.S. Patent Application Publication Nos. 20030012705, 20030023010, and 20030027944, European Patent 1195388 and PCT Application Publication No. WO2004094489, the disclosures of which are incorporated herein by reference) or stirred tank reactors (as described in PCT Application Publication No. WO2003016362, the disclosure of which is incorporated herein by reference). Exemplary gas phase polymerization systems include those described in U.S. Pat. Nos. 6,187,866; 6,846,886 and 6,617,405, the disclosures of which are incorporated herein by reference.

Catalyst Support Gel Treatment

The catalyst support gel treatment process includes two distinct procedures. The first such procedure is calcination. The catalyst support gel is calcined in either air or an inert gas. Due to the small particle size of the catalyst support gel, a rotary kiln is preferably used. The particles are continuously agitated while heated to prevent agglomeration. A batch kiln is preferred, although continuous plug flow kilns are also acceptable. Calcination occurs at a temperature of greater than 300° C. to up to the sintering temperature of the catalyst support gels. In general, the calcination temperature ranges from 350 to 900° C. If the chromium containing compound used is one which must be oxidized to a $Cr^{+6}$ valence state, air or oxygen is preferably used as the heating gas. The catalyst support gel may subsequently be cooled under an inert gas, such as nitrogen, to a temperature less than 300° C.

The catalyst support gel is further impregnated with a chromium containing compound. The impregnation process may be conducted in either an aqueous or non-aqueous environment. In aqueous impregnation, the catalyst support gel is slurried in water at a neutral pH. Sufficient water soluble chromium containing compound is added to provide the desired amount of chromium in the catalyst particles. Following aqueous impregnation, the catalyst support gel may be calcined or otherwise dried at a temperature sufficient to remove water. Typically, a drying temperature of about 150° C. is used. In non-aqueous impregnation, the catalyst support gel is calcined or otherwise dried at a temperature sufficient to remove any adsorbed water. Typically, a drying temperature of about 150° C. is used. The catalyst support gel is then dispersed in a non-aqueous solvent. Exemplary non-aqueous solvents include alkyl alcohols, such as methanol to form a catalyst support gel slurry. Certain organochromium compounds exemplified by bis cyclopentadienyl chromium that are soluble in aromatic solvents may also be used. The chromium containing compound is then added to the catalyst support gel slurry and the solvent may subsequently be evaporated or otherwise removed. Optionally, adjuvants, such as titanate esters, may be added during the impregnation process. If an aromatic solvent is used the solvent removal step is not required in all embodiments of the invention.

Reaction of Calcined Catalyst Support Gel with Chromium Containing Compounds

In some embodiments of the inventive process, the catalyst support gel does not contain a chromium containing compound. In such instances, the calcined non-chromium containing catalyst support gel is added to a hydrocarbon solvent, such as an aliphatic or aromatic solvent, to create a catalyst support gel slurry. A chromium containing compound is then added to the catalyst support gel slurry. In some embodiments, a chromate ester compound is added such that 5 to 20 micrograms of chromium, as metal, is present per square meter of catalyst support gel surface area. The chromate ester is generally insoluble in the hydrocarbon solvent thereby generally requiring a relatively long mixing time to allow the chromate ester to deposit on the catalyst support gel surface. Typically, the slurry is mixed for 1 to 24 hours. All individual values and subranges from 1 to 24 hours are included herein and disclosed herein. For example the slurry may be mixed for 1, 2, 6, 10, 14, 18, 22, or 24 hours. The chromium treated catalyst support gel may remain in the slurry while additional components are added. Alternatively, the solvent may be removed to provide a chromium treated catalyst support which may be stored for subsequent use.

Suspension in Solvent Prior to Spray Drying

Prior to the spray drying step, the chromium treated catalyst support gel is suspended in a solvent which is free of impurities that may react with $Cr^{+6}$ species. Such impurities include, for example, oxygen and water.

Reassembly by Spray Drying

The suspension prepared as described above containing the chromium impregnated catalyst support gel, optional binders, optional transition metal components and MAO or IBAO (where added in the specific embodiment) is used as feedstock to a spray dryer. Any known atomization system may be used. In particular embodiments, a rotary atomizer or a pressure nozzle for atomization may be used. Rotary atomizers are particularly preferred due to their ability to atomize feedstocks containing solids. The atomizer is preferably capable of generating a droplet size distribution such that the size of the overall dried particles is in the appropriate range for polymerization in a particle forming reactor. For use in gas phase fluidized bed polymerization systems, the spray dried catalyst should have a particle size, $D_{50}$, from 10 to 75 microns. For use in slurry reaction systems, the spray dried catalyst should have a particle size, $D_{50}$, from 5 to 50 microns.

In certain embodiments of the inventive process, the spray drying process produces less than 5 percent by weight very fine catalyst particles characterized by a volume average particle size of less than 1 micron.

In an alternative embodiment, the instant invention provides a process for preparing a catalyst and a catalyst made thereby in accordance with any of the preceding embodiments, except that a closed cycle spray dryer, i.e. one in which the solvent evaporated is condensed from the drying gas and the drying gas then recycled, is used. U.S. Pat. No. 5,290,745, the disclosure of which is incorporated herein by reference, describes one closed cycle spray dryer which may be used in certain embodiments of the invention. An open cycle spray dryer may be used, but will result in usage of large amounts of drying gas and require a secondary means to control the emission of the solvent vapors included in the drying gas. Contaminants, such as water, oxygen, and carbon dioxide, are preferably excluded from the drying gas. Generally, the drying gas should have less than1 ppm volume of any contaminant which is reactive with the transition metal components in the catalyst.

Following the spray drying step, catalyst particles may be collected using any known method. In a particular embodiment, the catalyst particles are collected using a cyclone. The use of cyclones also allows for the preferential exclusion of the finer particles by tuning the design of the cyclone, i.e. changing the minimum cut diameter. Such techniques are known in the art and are taught, for example, in K. M. Masters, "Spray Drying."

Catalyst Feed

Catalyst prepared according to embodiments of the invention may be fed to the polymerization reactor using a dry feed method or as a slurry in a hydrocarbon diluent. In some instances, it is preferred that the catalyst be dispersed in a hydrocarbon which is a non-solvent for the binder and which is non-reactive to any of the active catalyst components. When the catalyst is used in slurry form, heavy hydrocarbon diluents, such as aliphatic mineral oils, are preferred carriers because they provide protection against rapid settling of the catalyst particles and protection against adventitious moisture and oxygen. When used in a slurry form, additional modification of the catalyst may be undertaken either off-line, in batch mode, or in an in-line mode as described, for example, in U.S. Provisional Application Nos. 60/469,663 and 60/469,665, the disclosures of which are incorporated herein by reference.

EXAMPLES

The following examples illustrate the present invention but are not intended to limit the scope of the invention. All of the following examples and procedures are prophetic in nature irrespective of the tense of the verbs used in describing such examples and/or procedures. No comparative examples are provided herein.

Catalyst Support Treatment

Catalyst support gels are calcined in a batch rotary kiln to the specified temperature and for the specified duration, as described below. In all cases, the catalyst supports are then cooled under nitrogen prior to use in the process to prepare a catalyst. Chromium treatment with an oxidizable chromium containing compound is performed using one of the methods specified previously. The conditions are given in Table 1.

TABLE 1

| Cat. support type | Cat. Support Ex. No. | Calcine Temp., °C. | Calcine time, Hours | Cr Treatment Type * | Cr Compound | Cr Loading (as Cr metal) |
|---|---|---|---|---|---|---|
| GASIL 23D | 1 | 600 | 4 | None | | 0 |
| GASIL 114 | 2 | 600 | 4 | None | | 0 |
| GASIL AB720 | 3 | 600 | 4 | None | | 0 |
| GASIL HP285 | 4 | 600 | 4 | None | | 0 |
| GASIL AB725 | 5 | 600 | 4 | None | | 0 |
| GASIL 23D | A1 | 150 | 2 | Aqueous Impregnation | $Cr(CO_2CH_3)_3$ | 0.5 |
| Cat. Support Ex. No. A1 | B1 | 750 | 4 | Oxidation | | |
| GASIL 114 | A2 | 150 | 2 | Non-aqueous Impregnation | $Cr(NO_3)_3$ in methanol | 0.2 |
| Cat. Support Ex. No. A2 | B2 | 750 | 4 | Oxidation | | |
| GASIL AB720 | A3 | 150 | 2 | Non-aqueous Impregnation | $Cr(NO_3)_3$ in methanol | 0.2 |
| Cat. Support Ex. No. A3 | B3 | 600 | 4 | Oxidation | | |
| GASIL HP285 | A4 | 150 | 2 | Non-aqueous Impregnation | $Cr(NO_3)_3$ in methanol | .75 |
| Cat. Support Ex. No. A4 | B4 | 750 | 4 | Oxidation | | |
| GASIL AB725 | A5 | 150 | 2 | Aqueous Impregnation | $Cr(CO_2CH_3)_3$ | 0.5 |
| Cat. Support Ex. No. A5 | B5 | 750 | 2 | Oxidation | | |

* The methods of chromium impregnation in Table 1 are described in more detail above.

GASIL catalyst support gels are commercially available from the PQ Corporation. Table 2 lists the physical properties of the GASIL catalyst support gels used in Table 1.

TABLE 2

| Cat. support type | Cat. Support Ex. No. | Pore Volume cc/gram | Particle size, microns | Surface area, m²/gram | Oil adsorption, g/100 grams |
|---|---|---|---|---|---|
| GASIL 23D | 1 | 1.6 | 4.6 | 290 | 290 |
| GASIL 114 | 2 | 1.2 | 6.5 | 320 | 200 |
| GASIL AB720 | 3 | ~0.5 | 3.2 | 500 | 90 |
| GASIL HP285 | 4 | 1.8 | 8.7 | 280 | 280 |
| GASIL AB725 | 5 | 1 | 5.3 | 400 | 160 |

Table 3 provides the physical properties of certain catalyst support gels prior to comminution. In Table 3, "APD" means average pore diameter

TABLE 3

| Cat. support type | Pore volume, cc/g | Surface area, m²/g | Average Pore Diameter, Angstrom | Average Particle Size, micron | Ti content, % |
|---|---|---|---|---|---|
| Silica Supports | | | | | |
| GRACE 955 | 1.62 | 310 | 210 | 55 | — |
| GASIL PQ M 3050 | 3.02 | 513 | 198 | 90 | — |
| Cogel Supports | | | | | |
| CROSFIELD EP52 | 1.15 | 490 | 104 | 94 | 2.60 |
| GRACE 9702 | 2.58 | 444 | 232 | 153 | 2.30 |

GRACE 955 and 9702 supports are commercially available from W. R. Grace & Co. CROSFIELD supports are commercially available from INEOS Silicas Co. (Joliet Ill.).

Table 4 provides the physical properties of certain aluminum containing catalyst support gels prior to comminution.

TABLE 4

| Cat. support type | Pore volume, cc/g | Surface area, m²/g | Average Pore Diameter, Angstrom | Cr content, % | Al content, % |
|---|---|---|---|---|---|
| PQ C-34060MS | 2.46 | 364 | 270 | 0.26 | 2.87 |
| PQ C-34160MS | 2.45 | 354 | 277 | 0.50 | 3.00 |
| PQ C-23060 | 1.99 | 314 | 254 | 0.25 | 2.62 |
| PQ C-23160 | 2.09 | 336 | 249 | 0.48 | 2.86 |

Comminution Process

The comminution can be carried out using methods known in the art. Ball mills may be used and are particularly useful when the support has been thermally treated (i.e. calcinations with/without Cr compound addition). The ball milling may be done "dry" or with solvent present. When solvent is present, it is preferably the solvent that will be used in spray drying. Generally, ball milling will be done dry if the support will be later treated thermally.

An impact mill that uses a rotor to mechanically accelerate the feedstock into stationary blocks may also be used. The material shatters when impacting the stationary blocks. The shattered material is air or nitrogen swept out of the mill housing and into a cyclone. The cyclone can be adjusted, along with the gas flow, to cause dust (sub-micron particles) to be rejected and the larger particles retained in the cyclone. This operation may take place before or after any thermal treatment.

Fluid energy mills, in which particle to particle collisions result in size reduction, may also be used. Fluid energy mills are typically used in the pharmaceutical industry and can result in relatively narrow particle size distributions of the resultant comminuted solid.

Other mills may also be used, however these are well known in the art and render the final particles useful directly in the next step, i.e. the catalyst assembly by spray drying.

Preparation for Spray Drying

Typical reassembly by spray drying is conducted in the following manner: 1. Add the desired amount of toluene to the mix vessel; 2. Add the calcined, chromium impregnated catalyst support gel to the solvent while mixing; 3. Add polymeric binder; 4. Charge the desired quantity of MAO to the slurry feed vessel; 5. Charge the metallocene/non-metallocene catalyst components that are activated by MAO; and 6. Mix to disperse at 35° C. and spray dry. Table 5 provides the condition to use in preparing the spray dryer feedstock.

The solids content of the spray drying feedstock is adjusted to maintain 10 to 35 wt % solids in the feed. Table 5 provides a formulation for a typical slurry spray dryer feedstock.

TABLE 5

| Material | Function | Amount |
|---|---|---|
| Toluene | Solvent | 20.0 kg |
| 30% MAO in toluene | Binder and activator | 9.5 kg |
| Bis dibenzylzirconiumamide | Catalyst | 110 grams |
| n-propylcyclopentadienyl, tetramethylcyclopentidienylzirconium dichloride | Metallocene: catalyst | 9.5 grams |
| Calcined, chromium containing catalyst support gel | Catalyst | 2.8 kg |

Spray Drying

The spray dryer is operated in a closed cycle mode using a packed column with counter current chilled solvent as a scrubber. A rotary atomizer with a 120 mm diameter wheel and four or eight nozzles is used. Maximum atomizer speed is 24,000 RPM. Atomizer speed is adjusted to control final dry particle size. Nitrogen is the drying gas. For these examples, a 4 foot diameter Niro spray dryer is used. The particular spray dryer has a recycle gas flow rate that normally ranges between 250 and 650 pounds/hour. Higher cycle gas flow rate allows for higher outlet temperature from the dryer. Lower flow rates increase the residence time in the dryer. Both can affect the final particle properties. Inlet temperature is adjusted using a steam heated exchanger. The inlet temperature is controlled to maintain a fixed outlet temperature. There is no specific upper limit on the inlet temperature. The outlet temperature is adjusted such that the particles dry effectively and at a level such that the catalyst is not damaged by excess heat. Typical outlet temperatures range from 70 to 120° C. For catalysts using polymeric binders, the outlet temperature is sufficiently low such that the sticking temperature of the polymer is not exceeded. The scrubber outlet temperature is controlled to control the dewpoint of the drying gas. Typical values of −5 to +10° C. are used. Atomizer speed is adjusted to control particle size to the desired range. A typical range is between 50 and 100% of maximum speed. The inlet and outlet temperatures are the primary controls for residual solvent content; the scrubber outlet temperature affects the initial drying rate of the droplets and the atomizer speed controls the droplet size. The atomizer feed rate affects the heat balance and has some effect on the final particle size with higher feed rates giving larger particle size. The above described spray dryer is used to produce the following examples of catalyst prepared in accordance with the invention. Typical recovery of solids from the spray drying operation is greater than 90% by weight. Table 6 provides the materials to be used in preparing the spray dryer feedstock to prepare Catalyst Examples 1 and 2.

TABLE 6

| MATERIAL Feedstock Preparation | Catalyst Examples 1 and 2 Charge wt. in kg |
|---|---|
| Toluene | 16.99 |
| 30% MAO in Toluene | 8.11 |
| E-Metallocene MAO Solution (24.4 wt % in Toluene) | 0.303 |
| Catalyst support Ex. B1 | 2.4 |

The feedstock is prepared with a desired Al/Zr ratio of 245 and a Zr loading of 33.3 micromoles/gram dried solids. The Cr content of the dried catalyst is 0.25 wt %. Spray drying conditions are given in Table 9.

Table 7 provides the materials to be used in preparing the spray dryer feedstock to prepare Catalyst Examples 3 and 4.

TABLE 7

| MATERIAL Feedstock Preparation | Catalyst Examples 3 and 4 Charge wt. in kg. |
|---|---|
| Toluene | 17.29 |
| 30% MAO in Toluene | 8.09 |
| HN3—Zr | 0.11 |
| Catalyst Support Ex. B5 | 1.11 |
| Catalyst Support Ex. B4 | 1.1 |

The feedstock is prepared with a desired Al/Zr mole ratio of 231 and a Zr loading of 50 micromoles/gram dried solids. The Cr Content of the dried catalyst is 0.33 wt %.

Table 8 provides the materials to be used in preparing the spray dryer feedstock to prepare Catalyst Examples 5 and 6.

TABLE 8

| MATERIAL Feedstock Preparation | Catalyst Example 5 and 6 Charge wt. in kg. |
|---|---|
| Toluene | 11.73 |
| 30% MAO in Toluene | 5.22 |
| HN$_3$—Zr | 0.10 |
| Catalyst Support Ex. B5 | 0.48 |
| Catalyst Support Ex. B4 | 0.48 |

The feedstock is prepared with a desired Al/Zr mole ratio of 171. The Zr loading was 50 micromoles/gram dried solids. Cab-O-Sil TS 610 is added as a filler. The final Cr loading was 0.25 wt %.

Spray drying conditions for Catalyst Examples 1-6 are given in Table 9. In Table 9, all temperatures are given in C.°. 100% atomizer speed is 24,000 RPM. Oxygen values are those at the beginning of the spray drying run. Generally, this value goes to zero within 1 to 3 kg of feed. Feed rate is in pounds/hour. Drying gas flows are also measured in pounds/hour. A portion of the spray dryer cycle gas bypasses the drying chamber. This serves to improve temperature control. Alternately, the cycle gas blowers can be individually adjusted for flow rate.

TABLE 9

| | Cat. Ex. 1 | Cat. Ex. 2 | Cat. Ex. 3 | Cat. Ex. 4 | Cat. Ex. 5 | Cat. Ex. 6 |
|---|---|---|---|---|---|---|
| Inlet Temp | 150 | 140.5 | 150 | 150 | 150 | 150 |
| Outlet Temp (RTD) | 98.4 | 98.5 | 92 | 93 | 108 | 105.3 |
| Atomizer % | 70 | 95 | 70 | 95 | 95 | 70 |
| Oxygen ppm | 1 | 1 | 5 | 5 | 10 | 10 |
| Feed Rate lb/hr | 30 | 30 | 38-42 | 38-42 | 40 | 40 |
| Drying Gas Flow | 416 | 419 | 427 | 434 | 605 | 603 |
| Condenser out | −6 | −6 | −6 | −6 | −6 | −6 |

The condenser outlet temperature is the temperature of the gas exiting the scrubber condenser. The actual liquid in the condenser is, of course, lower.

The structures of X metallocene and E metallocene are given in Formulas 1 and 2, respectively.

Table 10 provides the materials to be used in preparing the spray dryer feedstock to prepare Catalyst Examples 7 and 8.

TABLE 10

| MATERIAL Feedstock Preparation | Catalyst Example 7 and 8 Actual |
|---|---|
| Toluene | 16.99 |
| 30% MAO in Toluene | 8.11 |
| E-Metallocene MAO Solution (24.4 wt % in Toluene) | 0.303 |
| HN3—Zr | 0.11 |
| Catalyst Support Ex. 1 | 2.4 |
| Silyl Chromate | 0.012 |

The feedstock is prepared with a desired Al/Zr ratio of 245 and a Zr loading of 33.3 micromoles/gram dried solids. The Cr content of the dried catalyst is 0.25 wt %.

Table 11 provides the materials to be used in preparing the spray dryer feedstock to prepare Catalyst Examples 9 and 10.

TABLE 11

| MATERIAL Feedstock Preparation | Catalyst Examples 9 and 10 Charge wt. in kg. |
|---|---|
| Toluene | 17.29 |
| E metallocene 30% MAO in Toluene | 8.09 |
| HN3—Zr | 0.11 |
| Silyl Chromate | 0.012 |
| Catalyst Support Ex. 1 | 1.11 |
| Catalyst Support Ex. 2 | 1.1 |

The feedstock is prepared with a desired Al/Zr mole ratio of 231 and a Zr loading of 50 micromoles/gram dried solids. The Cr Content of the dried catalyst is 0.25 wt %

Table 12 provides the materials to be used in preparing the spray dryer feedstock to prepare Catalyst Examples 11 and 12.

TABLE 12

| MATERIAL Feedstock Preparation | Catalyst Example 11 and 12 Charge wt. in kg. |
|---|---|
| Toluene | 11.73 |
| E metallocene 30% MAO in Toluene | 5.22 |
| HN3—Zr | 0.10 |
| Cab-O-Sil | 0.52 |
| Gel Particle 5 | 0.48 |
| Catalyst support Ex. 4 | 0.48 |
| Silyl Chromate | 0.006 |

The feedstock is prepared with an aim Al/Zr mole ratio of 171. The Zr loading is 50 micromoles/gram dried solids. Cab-O—Sil TS 610 is added as a filler. The final Cr loading is 0.2 wt %. Table 13 provides the spray drying conditions for Catalyst Examples 7-12.

TABLE 13

| | Cat. Ex. 7 | Cat. Ex. 8 | Cat. Ex. 9 | Cat. Ex. 10 | Cat. Ex. 11 | Cat. Ex. 12 |
|---|---|---|---|---|---|---|
| Inlet Temp | 150 | 140.5 | 150 | 150 | 150 | 150 |
| Outlet Temp (RTD) | 98.4 | 98.5 | 92 | 93 | 108 | 105.3 |
| Atomizer % | 70 | 95 | 70 | 95 | 95 | 70 |
| Oxygen ppm | 1 | 1 | ND | 5 | ND | 10 |
| Feed Rate lb/hr | 30 | 30 | 38-42 | 38-42 | 40 | 40 |
| Drying Gas Flow | 416 | 419 | 427 | 434 | 605 | 603 |
| Condenser out | −6 | −6 | −6 | −6 | −6 | −6 |

Table 14 provides the materials to be used in preparing the spray dryer feedstock to prepare Catalyst Example 13.

TABLE 14

| MATERIAL<br>Feedstock Preparation | Catalyst Example 13<br>Charge wt. in kg. |
|---|---|
| Toluene | 17.29 |
| 30% MAO in Toluene | 8.09 |
| HN3—Zr | 0.11 |
| Catalyst Support Ex. B4 | 2.2 |

The feedstock is prepared with an aim Al/Zr mole ratio of 231 and a Zr loading of 50 micromoles/gram dried solids. The Cr Content of the dried catalyst is 0.35 wt %.

Blends were made simulating the performance of the catalysts described above. Catalysts Example 7 produce polymer with a size exclusion chromatogram which is depicted in FIG. 1. In FIG. 1, the solid line indicates polymer produced using silyl chromate catalyst, the dashed 1 line indicates polymer produced using catalyst example 7 and the dashed double dotted line indicates polymer produced using a dual reactor.

I claim:

1. A process for preparing a catalyst comprising:
   (A) selecting a catalyst support selected from the group consisting of gels of silica, silica alumina, alumina, aluminum phosphate, aluminaphosphate, and combinations of two or more thereof;
   (B) mixing the catalyst support with one or more chromium containing compound, wherein the chromium containing compound is selected from the group consisting of chromium containing compounds which are oxidizable to a $Cr^{+6}$ state and chromium containing compounds wherein the chromium is in a $Cr^{+6}$ state;
   (C) mixing the catalyst support with one or more transition metal catalyst component;
   (D) calcining the catalyst support while continuously agitating to prevent agglomeration;
   (E) optionally for the chromium containing compound which is oxidizable to a $Cr^{+6}$ state, converting the chromium in the chromium containing compound to $Cr^{+6}$; and
   (F) spray drying the catalyst support to form catalyst particles;
   wherein steps (B)-(F) may occur separately in any order or wherein any one or more of steps (B)-(F) may be combined together; and
   wherein the catalyst support gels are characterized by a surface area greater than 50 $m^2$/gram and a pore volume greater than 0.5 cc/gram at the time of mixing the catalyst support gels with the chromium containing compound.

2. The process according to claim 1, wherein steps (B) and (D) are conducted sequentially.

3. The process according to claim 1, wherein step (B) occurs prior to steps (C)-(F) and steps (D) and (E) occur simultaneously.

4. The process according to claim 1, wherein the catalyst support selected in step (A) comprises gels larger than 50 micron characterized by a surface area greater than 50 $m^2$/gram and a pore volume greater than 0.5 cc/gram, and wherein step (D) occurs following step (A) and is followed by comminution of the catalyst support gels to form gels characterized by a surface area greater than 50 $m^2$/gram and a pore volume greater than 0.5 cc/gram prior to step (B) and an average particle size less than 15 micron.

5. The process according to claim 1, wherein steps (A), (B) and (D) occur in order to form a chromium compound impregnated, calcined catalyst support gels, and further comprising suspension of the chromium compound impregnated, calcined catalyst support gels in a solvent containing a binder to form a suspension.

6. The process according to claim 5, wherein the binder is selected from the group consisting of methylalumoxane, polystyrene, polystyrene-ethylene copolymers, polysytrene allyl alcohol copolymers, polyvinylchloride, polyisoprene, polybutadiene, partially hydrogenated polyisoprene, modified methylalumoxane, polyvinylacetate, isobutylalumoxane, and trialkylaluminum compounds having the formula $AlR_3$ where R is a saturated alkyl group having more than 12 carbons and is soluble in aromatic solvents.

7. The process according to claim 1, wherein the chromium containing compound is selected from bis(triarylsilyl)chromates, and compounds characterized by the formula $R^b_2Cr$ where $R^b$ is a substituted or unsubstituted indenyl or cyclopentadienyl and wherein the two $R^b$ may be the same or different.

8. The process according to claim 1, wherein the chromium containing compound is selected from the group consisting of chromium containing compounds having a Cr+3 state which are water and/or alcohol soluble.

9. The process according to claim 1, wherein the chromium containing compound is characterized by the formula $Cr(NO_3)_3$ and/or the formula $Cr(CO_2)_3$.

10. The process according to claim 1, wherein the chromium containing compound is bis(triphenylsilyl)chromate.

11. The process according to claim 1, wherein the chromium containing compound is selected from the group consisting of bis-cyclopentadienylchromium, bis-indenylchromium, bis-pentamethycyclopentadienylchromium, and combinations of two or more thereof.

12. The process according to claim 1, wherein step (F) results in particles having a particle size of greater than 5 microns.

13. The process according to claim 12, wherein the resulting particles have a (volume or weight average) particle size of from 10 to 75 microns.

14. The process according to claim 12, wherein the resulting particles have a (volume or weight average) particle size of from 5 to 59 microns.

15. The process according to claim 13, further comprising polymerizing ethylene and optionally one or more co-monomers in the presence the catalyst particles in a gas phase fluidized bed.

16. The process according to claim 14, further comprising polymerizing ethylene and optionally one or more co-monomers in the presence of the catalyst particles which have been suspended in mineral oil, said polymerizing occurring in a slurry reaction system.

* * * * *